United States Patent [19]

Saito

[11] Patent Number: 5,757,379
[45] Date of Patent: May 26, 1998

[54] IMAGE COMMUNICATING APPARATUS PROVIDING PROPER DISPLAY OF RECEIVED IMAGES WITH FACILITATED USER CONTROL

[75] Inventor: Takahiro Saito, Kanagawa, Japan

[73] Assignee: Fuji Xerox Co., Ltd., Tokyo, Japan

[21] Appl. No.: 425,200

[22] Filed: Apr. 20, 1995

[30] Foreign Application Priority Data

Sep. 13, 1994 [JP] Japan .................. 6-243416

[51] Int. Cl.[6] .................................... G06T 11/00
[52] U.S. Cl. .................................... 345/433
[58] Field of Search .................. 395/133, 137, 395/145–148, 155, 161, 200, 787, 326, 348, 352, 766, 779, 785, 786, 788, 789; 358/400, 426, 443, 452; 345/433

[56] References Cited

U.S. PATENT DOCUMENTS 5,299,018  3/1994  Jefferson .................. 358/426
5,305,397  4/1994  Yamaguchi et al. .................. 382/46
5,486,686  1/1996  Zdybel, Jr. et al. .................. 235/375

*Primary Examiner*—Almis R. Jankus
*Attorney, Agent, or Firm*—Finnegan, Henderson, Farabow, Garrett & Dunner, L.L.P.

[57] ABSTRACT

An image communication apparatus consists of a transmission section and reception section. The transmission section introduces the image of a text page, generates an image edit instruction for the image in response to the user's action, and transmits the image of the text page, with the image edit instruction being appended thereto, to other image communication apparatus. The reception section receives the image of a text page, with image edit instruction being appended thereto, sent from other image communication apparatus, edits the received image in accordance with the appended image edit instruction, and displays the edited image of the text page. The user of the sending unit merely needs to take a single instructing operation for displaying a text page and editing (rotating) the image to rectify the image layout direction if necessary.

3 Claims, 8 Drawing Sheets

IMAGE COMMUNICATING APPARATUS PROVIDING PROPER DISPLAY OF RECEIVED IMAGES WITH FACILITATED USER CONTROL

BACKGROUND OF THE INVENTION

1. Field of the Invention

The present invention relates to an image transmission apparatus which introduces the image of a document (text) and transmits the image data, an image reception apparatus which receives image data of a text and displays or prints the image, and an image communication apparatus which is the combination of the image transmission and reception apparatus.

2. Description of the Related Art

As this kind of apparatus, there has been known the facsimile unit. The facsimile unit merely prints received images, and therefore images received upside down or in 90° rotation do not matter significantly.

Some recent personal computers have an additional function of facsimile so that images sent or received by them are displayed on the display screen, and some facsimile units are equipped with a display screen. For such a facsimile unit having a display function, if an image is received upside down, it will be very difficult for the user to view the displayed image. On this account, some facsimile unit is designed to display a received image by turning it upside down on the part of the receiving unit, as disclosed in Japanese Patent Laid-open No. Hei 4-150142. Some other facsimile unit is designed to rectify the image layout direction for the image entered upside down prior to the transmission, instead of compelling the receiving unit to reverse the image for display, as disclosed in Japanese Patent Laid-open No. Hei 5-48871.

Some conventional image communication apparatus are designed to partly edit a received image for size modification, color processing, etc. on the part of the receiving unit besides the above-mentioned correction of layout direction so as to match with the performance of processing before displaying the image. For example, in the apparatus described in Japanese Patent Laid-open No. Hei 5-12388, an image processing unit (sending unit) processes created data of image including image forming commands and control parameters thereby to generate image data and sends the image data to an output unit (receiving unit) so that the output unit displays or prints the received image data. In this case, if the output unit has the edit function for processing the received image data based on its own image forming commands and control parameters, the image processing unit sends data of image, with image forming commands and control parameters being converted to those of the output unit, to the output unit so that it processes the data in accordance with the converted image forming commands and control parameters for display or printing. This prior art apparatus is intended to share the load of image editing process between the image processing unit and output unit so that the load of the image processing unit is reduced and the faster response of image output is accomplished.

For image data communication, it is a general convention to use a data format in which image data has the appendage of a header indicative of the attribute of the image, as described in Japanese Patent Laid-open No. Hei 5-167756, for example.

However, in the foregoing prior art method of reversing the layout direction of a displayed image on the part of the receiving unit, the user must decide and instruct the rotation of the displayed image. When a text is sent to units in many places, many users of receiving units must take this action.

In the case of sending a text including vertically long pages and horizontally long pages, some pages need to be rotated by 90° (clockwise or counterclockwise) so that the user can easily view all pages on the display screen. However, the prior art apparatus are not designed to allow 90° image rotation. Moreover, text pages will possibly be printed in different layout directions.

In the apparatus described in Japanese Patent Laid-open No. Hei 5-12388, the output unit operates automatically for the image process without the need of user intervention. However, the image processing unit needs to have and use command conversion functions adapted to individual output units connected to it through a network, resulting in a complex arrangement of the apparatus.

SUMMARY OF THE INVENTION

The present invention is intended to overcome the foregoing prior art deficiencies, and its prime object is to minimize the need of user intervention on the receiving unit for the judgement and operation in displaying a received image properly.

Another object of the present invention is to simplify the arrangement of sections that are added to the sending unit and receiving unit for the accomplishment of the above-mentioned prime object.

Still another object of the present invention is to enable the receiving unit to print text pages in a rectified layout direction so that the user does not need to rearrange by rotation the sheets of printed paper.

The image transmission apparatus based on this invention comprises an image input means for introducing an image, an instructing means for instructing the editing for the image entered by the image input means, and a transmission means for transmitting the image entered by the image input means, with image edit instruction information provided by the instructing means being appended thereto.

The image receiving apparatus based on this invention comprises a reception means for receiving an image, with image edit instruction information being appended thereto, an image editing means for editing the image received by the reception means in accordance with the appended image edit instruction information, and a display means for displaying the edited image provided by the image editing means.

The image communication apparatus based on this invention is the combined arrangement of the foregoing image transmission apparatus and image reception apparatus.

Alternatively, the image transmission apparatus based on this invention comprises an image input means for introducing an image, an instruction means for instructing the rotation for the image entered by the image input means, an image rotation means for implementing a 180° rotation process for the image entered by the image input means in response to the rotation instruction and in accordance with rotation instruction information provided by the instruction means, a rotation information altering means for altering, in the event of image rotation by the image rotation means, the rotation instruction information so as to be applied to the rotated image, and a transmission means for transmitting the image which has been entered by the image input means and rendered the rotation process by the image rotation means, with the altered rotation instruction information provided by the image rotation information altering means being appended thereto.

Alternatively, the image communication apparatus based on this invention comprises an image input means for introducing an image, an instruction means for instructing the rotation of the image entered by the image input means, an image rotation means for implementing a 180° rotation process for the image entered by the image input means in response to the rotation instruction and in accordance with rotation instruction information provided by the instruction means, a rotation information altering means for altering, in the event of image rotation by the image rotation means, the rotation instruction information so as to be applied to the rotated image, a transmission means for transmitting the image which has been entered by the image input means and rendered the rotation process by the image rotation means, with the altered rotation instruction information provided by the image rotation information altering means being appended thereto, a reception means for receiving an image, with image rotation instruction information being appended thereto, a received image rotation means for rotating the image received by the reception means in accordance with the appended image rotation instruction information, and a display means for displaying the rotated image provided by the received image rotation means.

In the operation of the inventive image transmission apparatus, the transmission means transmits the image which has been entered by the image input means, with image edit instruction information for instructing the receiving unit how to edit the received image for display being appended thereto. The image edit instruction information includes such instruction items as image rotation, expansion, contraction, and color processing. In the case of the image edit instruction for the page rotation for a text, the user operates the instruction means to specify an item among 90° cw (clockwise) rotation, 90° ccw (counterclockwise) rotation, 180° rotation, and no-rotation (0° rotation) for example, while viewing the layout direction of each text page displayed. Communication image data transmitted by the transmission means is formatted to include an edit instruction field within a page header for image data of each page as shown in FIG. 3(a) for example.

In order to carry out the image edit instructions for page rotation, the receiving unit necessitates several processing functions of 90° cw rotation, 90° ccw rotation, 180° rotation, etc. With the intention of simplifying the role of receiving unit, one form of this invention (set forth in Claim 4) is designed such that the sending unit implements a 180° rotation for image data when necessary depending on the layout direction of the image so that the receiving unit merely needs to have only additional function of 90° cw rotation (or 90° ccw rotation). This is based on the principle that a 90° ccw (or 90° cw) rotation is equivalent to a 180° rotation plus a 90° cw (or 90° ccw) rotation.

Specifically, when the user instructs a 90° ccw (or 90° cw) rotation for an entered image (shown by 84 for page 4 in FIG. 8), it is rotated by 180° to produce an image to be transmitted (shown by 88 in FIG. 8), and the rotation instruction information issued is to make a 90° cw (90° ccw) rotation for the received image (see FIG. 8). When the user instructs a 180° rotation for an image entered upside down (shown by 83 for page 3 in FIG. 8), it is rotated by 180° to produce an image to be transmitted (shown by 87 in FIG. 8), and the rotation instruction information issued is to make no rotation for the received image.

Namely, in response to the user's instruction through the instruction means of 180°, 90° cw or 90° ccw rotation, the image rotation means operates to rotate the entered image, and the image rotation information altering means produces rotation instruction information for the 180° rotated image. Only possible rotation instruction information is 90° rotation or no-rotation. The transmission means gets the image from the image rotation means, appends the rotation instruction information provided by the image rotation information altering means to the image, and transmits the resulting communication image data.

In the operation of the inventive image reception apparatus, the reception means receives communication image data including image data and image edit instruction information from the image sending unit, the image editing means edits the received image in accordance with the image edit instruction information, and the display means displays the edited image. In displaying the received image on the receiving unit, the user is free from taking the action of specifying an appropriate image rotation by viewing the layout direction of the displayed image, which is the case of the prior art apparatus.

In case image editing is to make an image rotation and communication image data consists of image data with or without the rendition of 180° rotation and rotation instruction information indicative of a 90° rotation or no-rotation for the image, the receiving unit is merely required to have an additional function of 90° rotation in a fixed direction to display the received image intact or by rotating it by 90° in the fixed direction in accordance with the received rotation instruction information. In addition, text pages printed on the receiving unit have only two possible layout directions, and the user is free from rearranging sheets of printed paper.

By combining the foregoing arrangement of the inventive image transmission apparatus and image reception apparatus into an integrated image communication apparatus, it performs bi-directional image transmission.

DETAILED DESCRIPTION OF THE PREFERRED EMBODIMENTS

Embodiment 1

Figure 1:
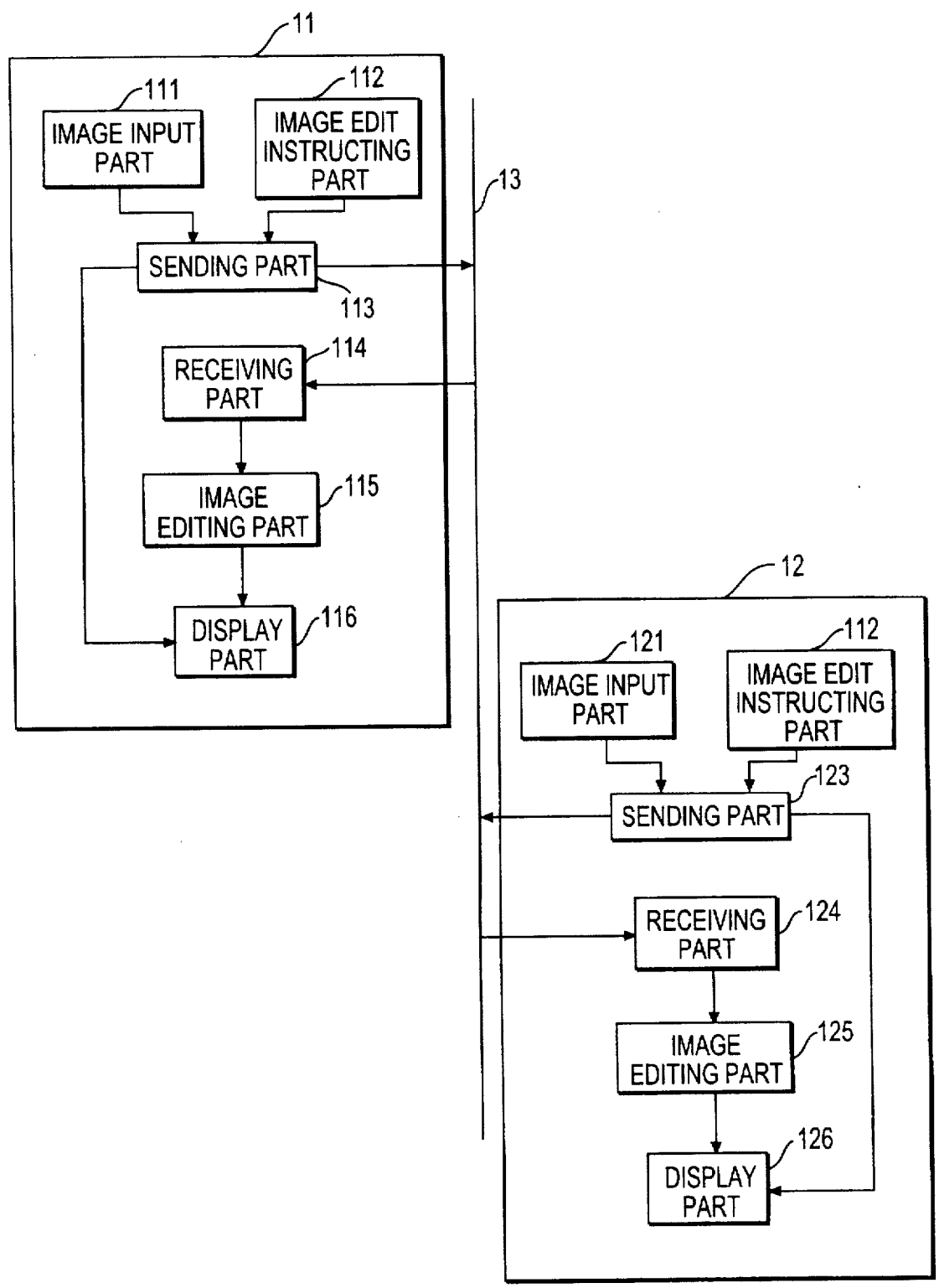
FIG. 1 is a functional block diagram of the image communication apparatus based on an embodiment of this invention.

FIG. 1 shows the principal functional blocks of the apparatus of the first embodiment. In the figure, two image communication units 11 and 12 are connected through a communication path 13. The image communication unit 11 consists of a transmission section and a reception section. The transmission section includes an image input part 111 such as an image scanner for introducing the image of a text, an image edit instructing part 112 which instructs image editing for the image entered by the image input part 111, and a sending part 113 which appends image edit instruction information provided by the image edit instructing part 112 to the image entered by the image input part 111 and transmits the resulting communication image data to other image communication unit 12. The reception section includes a receiving part 114 which receives communication image data of an image, with image edit instruction information being appended thereto, sent from other image communication unit 12, an image editing part 115 which edits the image received by the receiving part 114 in accordance with the image edit instruction information, and a display part 116 which displays the edited image provided by the image editing part 115. The other image communication unit 12 have the same functions as the image communication unit 11.

Figure 2:
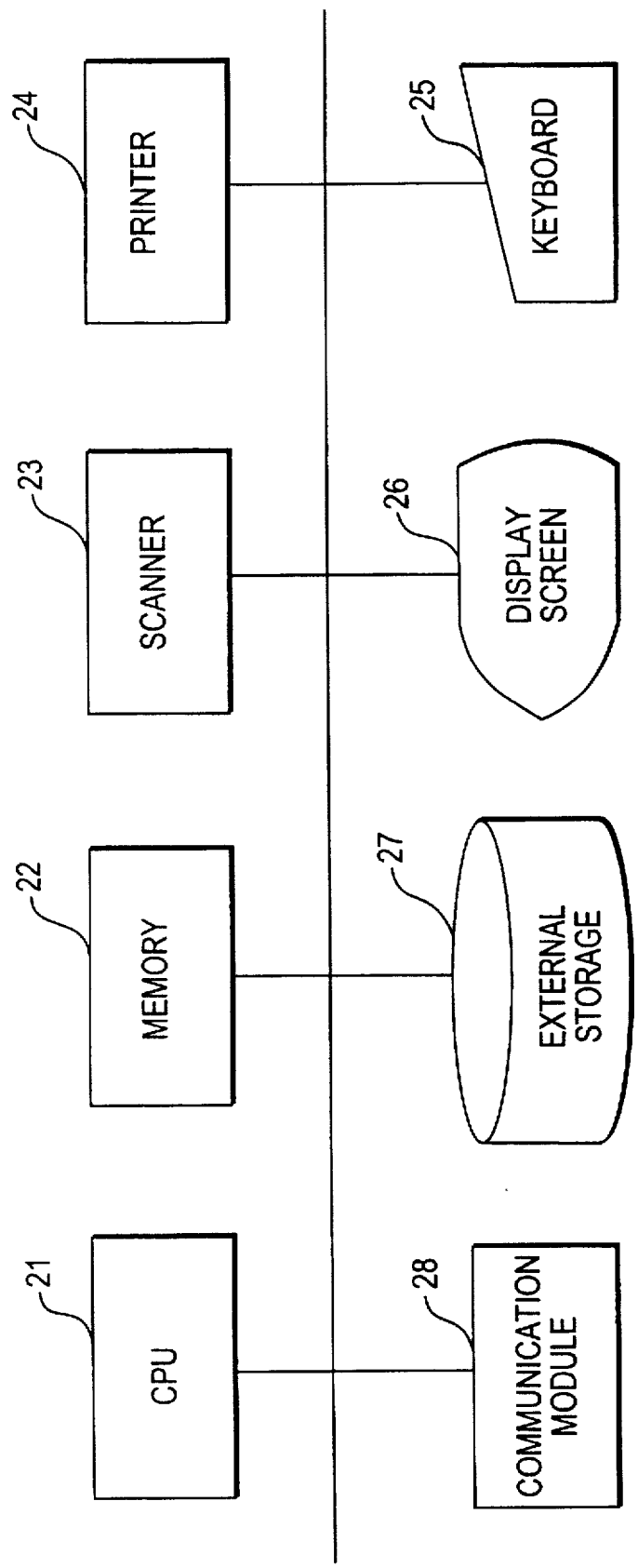
FIG. 2 is a block diagram showing the hardware arrangement of the image communication apparatus of this first embodiment.

FIG. 2 shows the principal hardware arrangement of the image communication units 11 and 12. Each unit includes a CPU 21, a memory 22, an image scanner 23, a printer 24, a keyboard 25, a display screen 26, an external storage 27, and a communication module 28. The image scanner 23 is used for the image input part 111 and the keyboard 25 is used for the image edit instructing part 112 shown in FIG. 1. The CPU 21 and memory 22 operate in unison to create image edit instruction information to be appended to the entered image, and the communication module 28 transmits the resulting communication data. The receiving part 114 implements the image data receiving function of the communication module 28. The CPU 21 and memory 22 operate in unison to carry out the editing process of the image editing part 115, and the display screen 26 implements the display function of the display part 116.

Figure 3A:
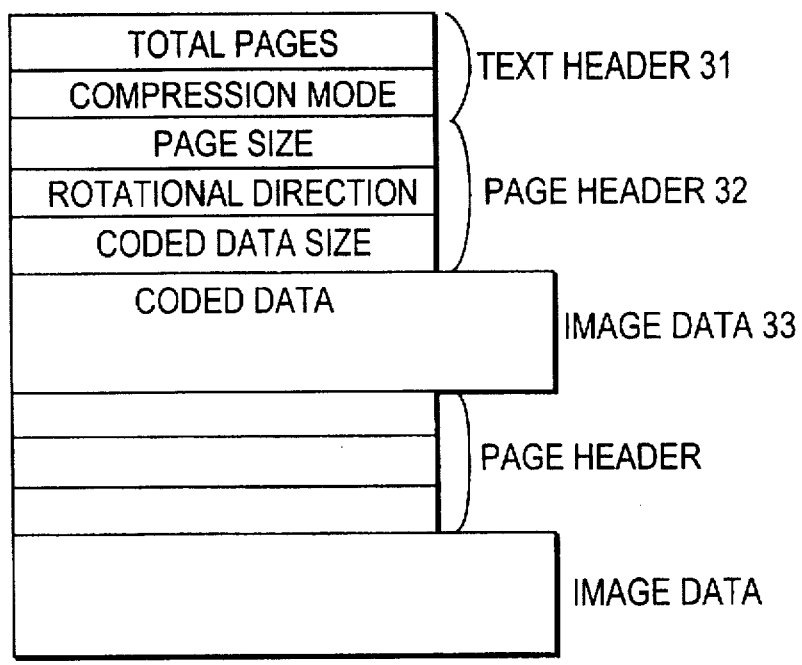
FIGS. 3(a–b) are sets of diagrams showing by (a) the data format of communication image data based on this invention, and showing by (b) the data format of communication image data based on the prior art apparatus.

FIG. 3(a) shows the data format of communication image data based on this embodiment. The communication image data consists of a communication text header 31 including fields of the total number of pages and data compression mode, and a plurality of sets of page header 32 and image data 33 for individual text pages. The page header 32 includes fields of the page size, image edit instruction information such as the rotational direction, and coded data size.

Figure 3B:
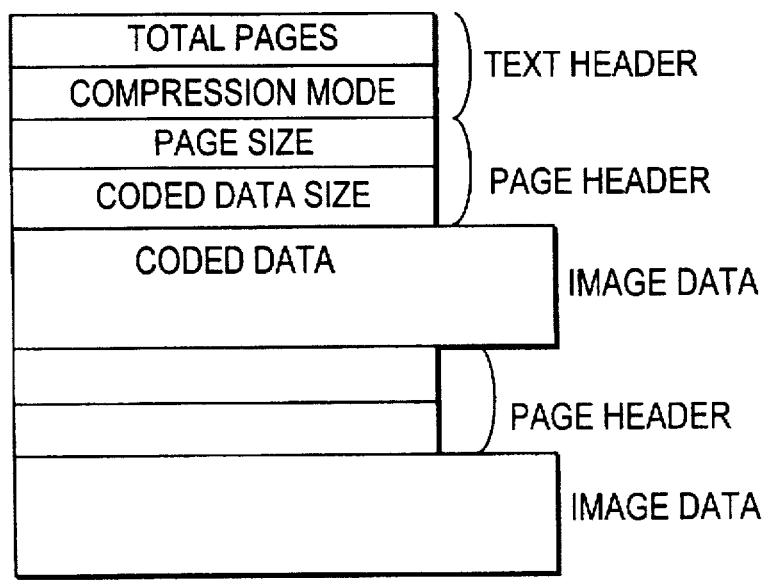

FIG. 3(b) shows the data format of communication image data of the prior art apparatus. It does not include the image edit instruction information used in this embodiment of invention.

Figure 4:
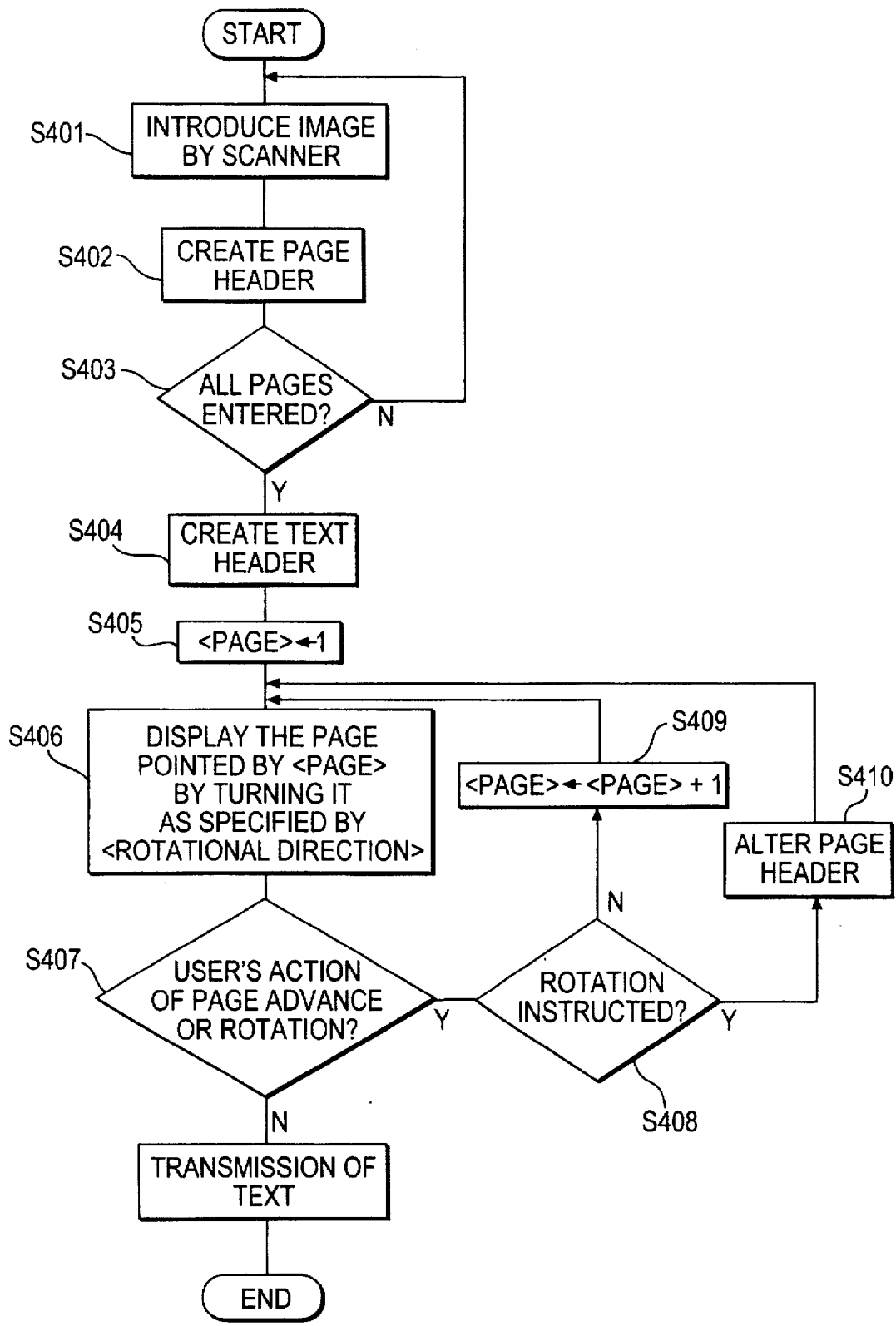
FIG. 4 is a flowchart showing the operation from image input up to image data transmission implemented by the image communication apparatus of the first embodiment.

The operation from image input up to transmission of the image communication unit arranged as described above will be explained on the flowchart of FIG. 4. Initially, the image input part (scanner) 111 is operated to introduce the image of a text page, and image data for the text page is created: (step 401). Subsequently, the page header 32 is created:(step 402). The page header has its field of page rotation direction initialized to indicate no-rotation. These steps of operation are repeated for all text pages, and on completion of introducing the last page:(step 403), the communication text header 31 for the entire text is created: (step 404).

The page argument is set to "1":(step 405), and the image of the first text page is displayed on the display part (display screen) 116:(step 406). The user views the displayed image and instructs the image rotation on the image edit instructing part 112 (keyboard 25) if the image is displayed upside down or in the state of 90° cw or ccw rotation. Otherwise, the user advances the text page. The processor of the sending part 113 detects the user's action:(step 407), and detects whether the rotation is instructed:(step 408). On detecting the instruction of rotation, the field of rotational direction in the page header is set to indicate cw or ccw rotation:(step 410) and the image rotated accordingly is displayed:(step 406). On confirming the normal layout direction of the displayed image, the user advances the text page, and the page argument is incremented (step 409).

The images of the text pages are displayed sequentially by being pointed by the page argument. After all text pages have been displayed and checked by the user, communication image data of the text is transmitted:(step 411). Although in this embodiment all pages of a text are introduced, displayed and then transmitted, it is also possible to introduce, display and transmit each page of a text.

Figure 5:
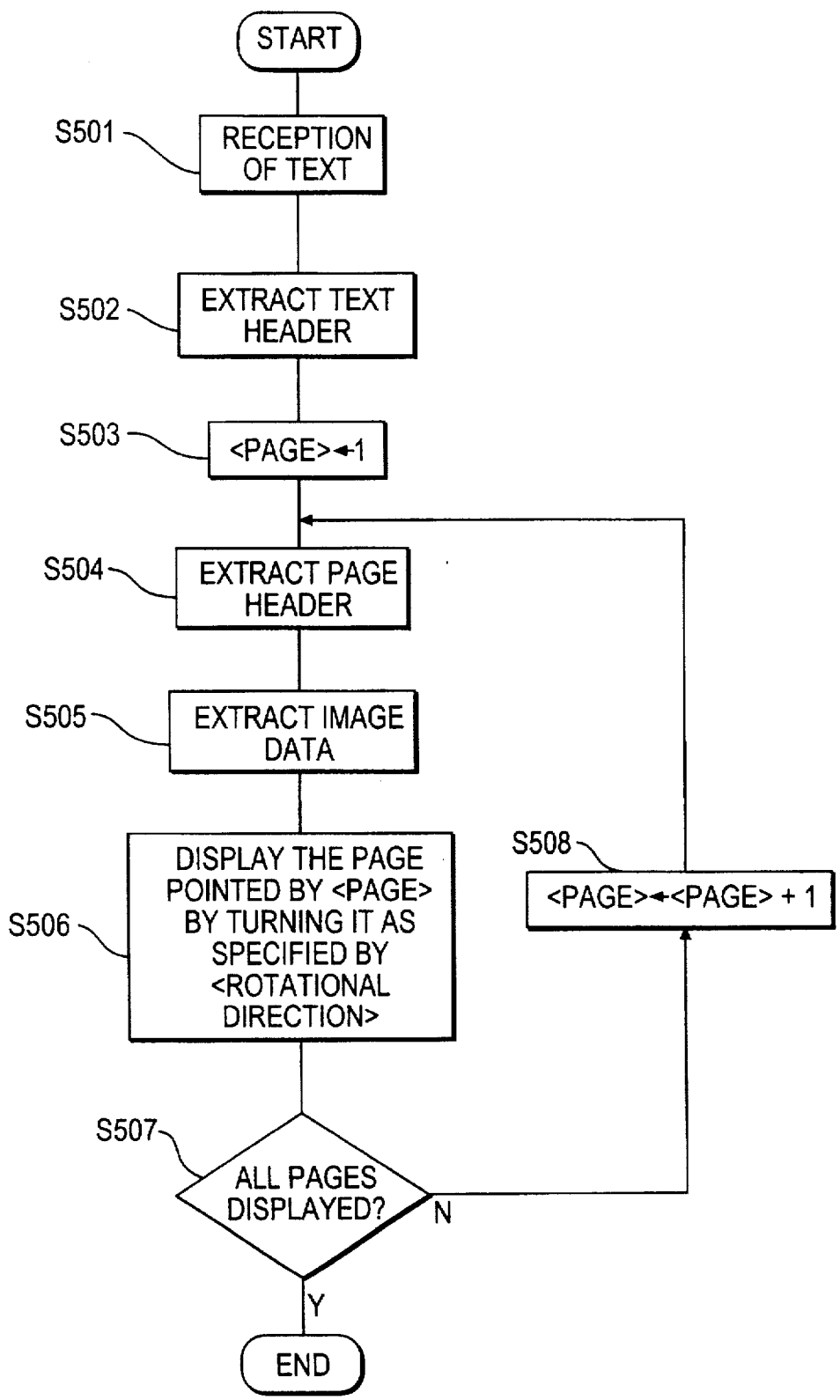
FIG. 5 is a flowchart showing the operation from image data reception up to image display implemented by the image communication apparatus of the first embodiment.

Next, the operation from image reception up to display of the apparatus of this embodiment will be explained on the flowchart of FIG. 5. Initially, communication image data of a text is received:(step 501), and the text header is extracted from the communication image data:(step 502). Subsequently, the page argument is set to "1":(step 503), the page header of that page (page 1) is extracted:(step 504), and image data of that page is extracted from the communication image data:(step 505). The image data is rendered the rotation process in accordance with the rotational direction indicated by the page header, and the resulting image is displayed:(step 506).

Whether page advancement or termination of operation is instructed by the user is detected:(step 507). On detecting the instruction of page advancement, the page argument is incremented:(step 508), and the steps 504–506 are repeated to extract the next page header and image data, process the image data, and display the image. On detecting the instruction of termination, the operation terminates.

Embodiment 2

In contrast to the first embodiment in which an image entered by the image input part is transmitted intact, with image rotation instruction information being appended thereto, and the receiving unit displays the image by rotating it in accordance with the image rotation instruction information, the second embodiment is designed to implement an appropriate rotation process for the entered image, produce image rotation information for the processed image and transmit the image data, with image rotation information being appended thereto.

Figure 6:
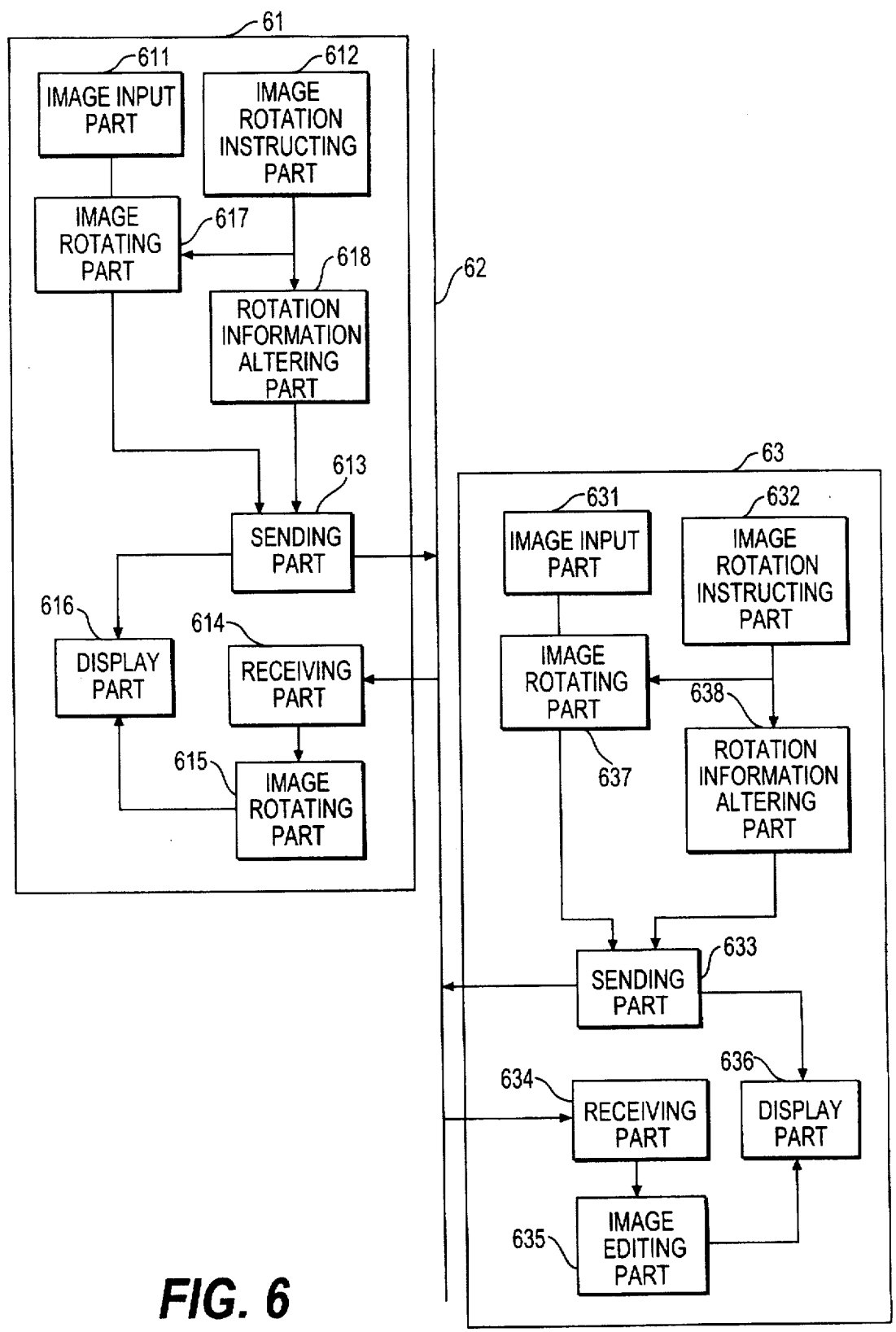
FIG. 6 is a functional block diagram of the image communication apparatus based on another embodiment of this invention.

FIG. 6 shows the functional blocks of this embodiment, which is derived from the first embodiment and added by an image rotating part 617 and image rotation information altering part 618. The unit includes an image input part 611 which introduces the image of a text, an image rotation instructing part 612 on which the user instructs the rotation for the entered image when necessary, an image rotating part 617 which implements a rotation process for the image entered by the image input means in response to the rotation instruction and in accordance with rotation instruction information provided by the image rotation instructing part 612, a rotation information altering part 618 which alters, in the event of image rotation by the image rotating part 617, the rotation instruction information so as to be applied to the rotated image, a sending part 613 which transmits the image which has been entered by the image input part 611 and rendered the rotation process by the image rotating part 617, with the altered rotation instruction information provided by the image rotation information altering part 618 being appended thereto, and a display part 616 which displays the rotated image provided by the image rotating part 615.

Figure 7:
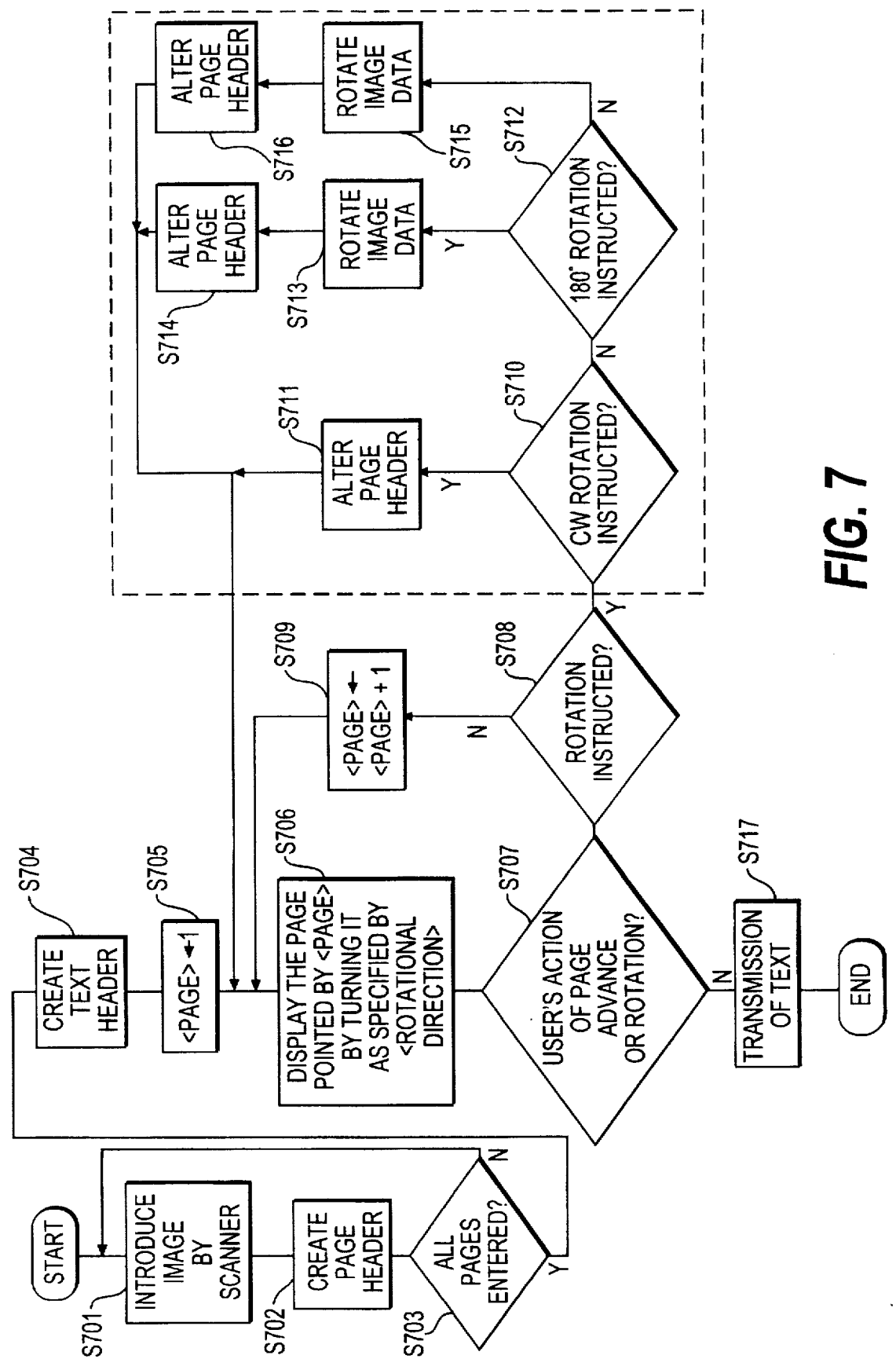
FIG. 7 is a flowchart showing the operation from image input up to image transmission implemented by the image communication apparatus of this second embodiment.

FIG. 7 shows on flowchart the operation from image input up to transmission of the apparatus of this embodiment. Part of the flowchart including steps 701–709 and 717 are identical to the flowchart of FIG. 4, and steps 710–716 enclosed in the rectangle of dashed line are added for this embodiment. The following explained only the additional portion.

For an entered and displayed image, the user can choose an image rotation from among 90° cw rotation, 90° ccw rotation, 180° rotation and no-rotation. When the user's instruction through the image rotation instructing part 612 is detected to be image rotation in step 708, whether it is cw rotation is tested:(step 710). On detecting the instruction of cw rotation, the field of rotational direction in the page header is altered from the initial state of no-rotation to rotation, with the image data being kept unchanged:(step 711), and the operational sequence proceeds to step 706. Otherwise, if the instruction detected in step 710 is not cw rotation, whether it is 180° rotation is tested: (step 712). On detecting the instruction of 180° rotation, the displayed image is rotated by 180° :(step 713), and the field of coded data size in the page header is altered if necessary, with the field of rotational direction being kept in the initial state (no-rotation): (step 714). The image is displayed by being being rotated by 180° relative to the initial image. Otherwise, if the step 712 denies 180° rotation, i.e., the instruction is found to be ccw rotation, the image data is rendered the 180° rotation process:(step 715), and the field of rotational direction in the page header is altered to cw rotation:(step 716). The image is displayed by being rotated by 90° ccw relative to the initial image.

Figure 8:
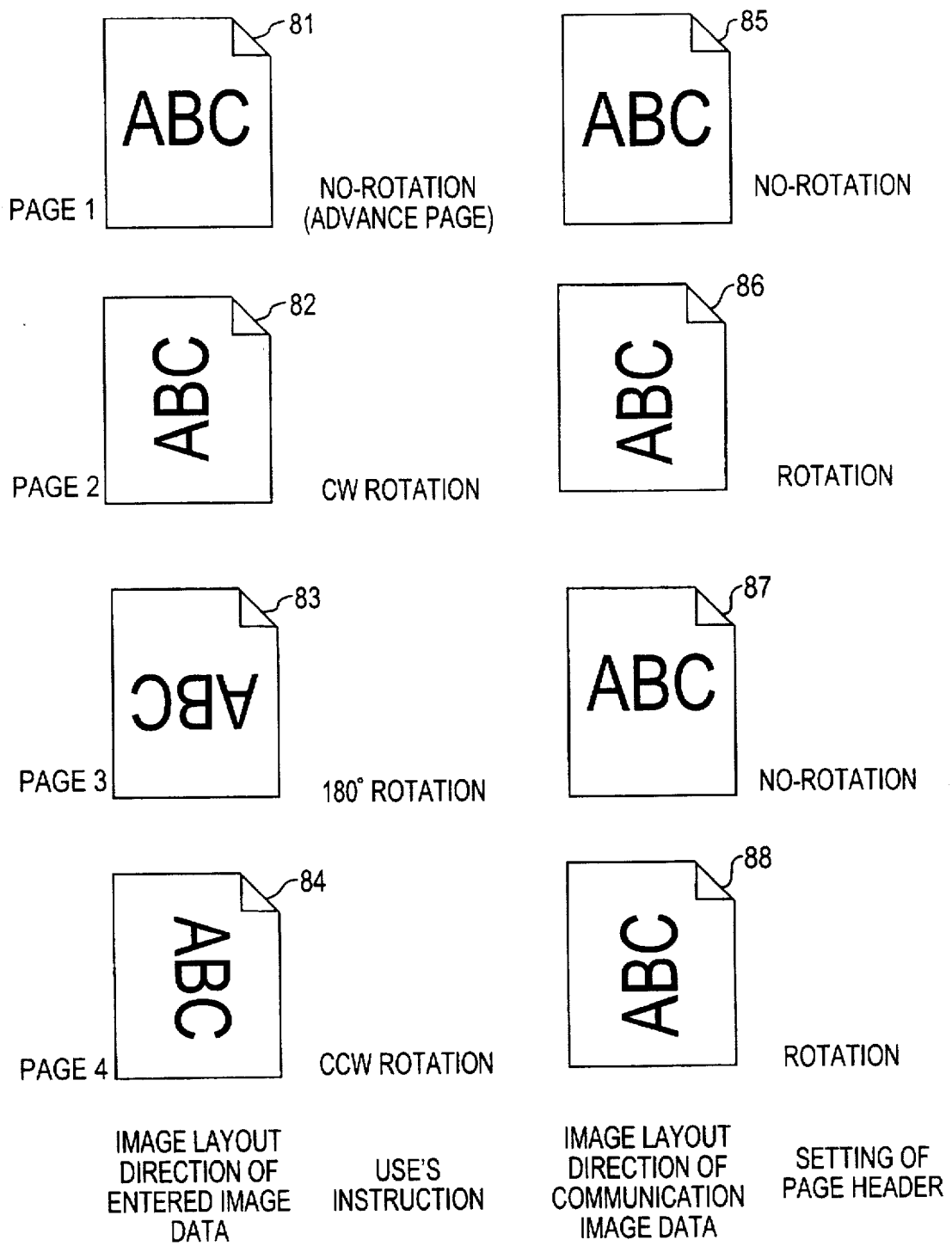
FIG. 8 is a diagram showing the cases of image rotation and corresponding settings of the page header in communication image data.

As a result of the foregoing operation, entered images having certain layout directions are given respective rotation instructions in the communication image data as shown in FIG. 8. The figure shows in the left-hand section the layout directions of images of four text pages entered through the image input part 611 (scanner), and shows in the right-hand section correspondingly layout directions of the images in communication image data.

Image 81 of page 1 is entered in the normal layout direction, and the user instructs no-rotation, and consequently the image is not rotated and the page header is set to be no-rotation. For image 82 of page 2, the user instructs cw rotation, and consequently the image is not rotated and the page header is set to be rotation. For image 83 of page 3 entered upside down, the user instructs 180° rotation, and consequently the image is rotated by 180°, resulting in a normal layout direction, and the page header is set to be no-rotation. For image 82 of page 4, the user instructs ccw rotation to correct the layout direction, and consequently the image is rotated by 180° and the page header is set to be rotation for transmission so that the received image data is rendered the cw rotation process to reproduce the image in the normal layout direction.

In this embodiment, as described above, the sending unit implements the rotation process for an image to be transmitted such that the image is reproduced in the normal layout direction through the rotation process in the fixed (cw) direction and transmits the processed image data, with the page header indicative of whether or not the image is to be rotated at reproduction being appended thereto, and the receiving unit merely needs to rotate the received image in the fixed (cw) direction in accordance with the page header. Consequently, the arrangement of the receiving unit can be simplified. Furthermore, received text pages are printed in only two possible layout directions, and the user does not need to rearrange by rotation the sheets of printed paper.

According to the present invention, the user of the sending unit merely needs a single instructing operation for displaying a text page and rotating the image if necessary. Consequently, the user's job is reduced. Specifically, in sending documents to receiving units of many places or in reviewing stored documents frequently, the user is free from doing such an repetitive editing operation as rotating a displayed page and displaying the rotated page.

According to the present invention, the sending unit creates instruction information of 180° rotation or cw (or ccw) rotation for image data to be transmitted, and the receiving unit merely needs to have an additional function of rotating the received image by 90° cw (or ccw). Consequently, the arrangement of the receiving unit is simplified.

According to the present invention, received text pages are printed in only two possible layout directions, and the user does not need to rearrange by rotation the sheets of printed paper.

What is claimed is:

1. An image transmission apparatus comprising:
   image input means for receiving image data;
   instruction means for instructing image rotation by a user, for the image data received by said image input means, to provide a rotation instruction information that is selected from the group consisting of 0°, 90°, 180°, and 270° rotation instruction information;
   image rotation means for implementing a 180° rotation process for the image data received by said image input means when the rotation instruction information provided by said instruction means is one of the group consisting of 180° and 270° rotation instruction information;
   rotation information altering means for altering, in the event of image rotation by said image rotation means, the rotation instruction information to 0° when the rotation instruction information is 180° and to 90° when the rotation instruction information is 270°;
   appending means for appending the altered rotation instruction information provided by said rotation information altering means as a header field of the received image data, upon which the rotation process has been implemented by said image rotation means, to create a communication data file;
   transmission means for transmitting the communication data file.

2. An image communication apparatus comprising:
   image input means for receiving image data;
   instruction means for instructing image rotation by a user, for the image data received by said image input means, to provide a rotation instruction information that is selected from the group consisting of 0°, 90°, 180°, and 270° rotation instruction information;
   image rotation means for implementing a 180° rotation process for the image data received by said image input means when the rotation instruction information provided by said instruction means is one of the group consisting of 180° and 270° rotation instruction information;
   rotation information altering means for altering, in the event of image rotation by said image rotation means, the rotation instruction information to 0° when the rotation instruction information is 180° and to 90° when the rotation instruction information is 270°;
   appending means for appending the altered rotation instruction information provided by said rotation information altering means as a header field of the image data, upon which the rotation process has been implemented by said image rotation means, to create a communication data file;
   transmission means for transmitting the communication data file;
   reception means for receiving the communication data file;
   received image rotation means for rotating the image data of the communication data file received by said reception means in accordance with the appended image rotation instruction information; and
   display means for displaying the rotated image data provided by said received image rotation means.

3. The image receiving apparatus of claim 2, further comprising:
   printing means for directly printing the image data of the communication data file received by said receiving means without consideration of the rotation instruction information appended thereto.

* * * * *